US011265485B2

(12) United States Patent
Tsuritani

(10) Patent No.: US 11,265,485 B2
(45) Date of Patent: Mar. 1, 2022

(54) MEASUREMENT APPARATUS, MOVABLE APPARATUS, AND VEHICLE

(71) Applicant: Ricoh Company, Ltd., Tokyo (JP)

(72) Inventor: Shoh Tsuritani, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/972,753

(22) PCT Filed: Jul. 24, 2019

(86) PCT No.: PCT/JP2019/029019
§ 371 (c)(1),
(2) Date: Dec. 7, 2020

(87) PCT Pub. No.: WO2020/026917
PCT Pub. Date: Feb. 6, 2020

(65) Prior Publication Data
US 2021/0258509 A1 Aug. 19, 2021

(30) Foreign Application Priority Data

Jul. 30, 2018 (JP) .............................. JP2018-142992

(51) Int. Cl.
*H04N 5/247* (2006.01)
*H04N 13/243* (2018.01)
(Continued)

(52) U.S. Cl.
CPC ........... *H04N 5/247* (2013.01); *H04N 13/243* (2018.05); *E01C 23/01* (2013.01); *G01C 7/04* (2013.01)

(58) Field of Classification Search
None
See application file for complete search history.

(56) References Cited

U.S. PATENT DOCUMENTS

| 6,040,853 A | 3/2000 | Delagnes et al. |
| 2016/0119520 A1* | 4/2016 | Park ..................... H04M 1/0264 348/373 |

(Continued)

FOREIGN PATENT DOCUMENTS

| CN | 103669182 A | 3/2014 |
| CN | 107059577 A | 8/2017 |

(Continued)

OTHER PUBLICATIONS

International Search Report and Written Opinion dated Feb. 11, 2020 in PCT/JP2019/029019 filed on Jul. 24, 2019.

(Continued)

*Primary Examiner* — Eileen M Adams
(74) *Attorney, Agent, or Firm* — Xsensus LLP

(57) ABSTRACT

A measurement apparatus (100) mountable on a movable apparatus (700) includes a first imaging device (130-1) configured to capture an image in a first image capture direction, the first image capture direction having a first angle with respect to a direction of travel of the movable apparatus (700), and a second imaging device (130-2) disposed next to the first imaging device (130-1) configured to capture an image in a second image capture direction, the second image capture direction having a second angle with respect to the direction of travel of the movable apparatus (700). The first imaging device (130-1) and the second imaging device (130-2) are disposed to overlap at least partially a first imaging range of the first imaging device (130-1) and a second imaging range of the second imaging device (130-2). At least one of the first image capture direction of the first imaging device (130-1) and the second image capture direction of the second imaging device (130-2) is set at a given angle with respect to a width dimension of the movable apparatus (700).

12 Claims, 24 Drawing Sheets

(51) Int. Cl.
  *E01C 23/01*   (2006.01)
  *G01C 7/04*   (2006.01)

(56) References Cited

U.S. PATENT DOCUMENTS

2017/0204569 A1* 7/2017 Shah ...................... H04N 5/247
2018/0272948 A1* 9/2018 Kumon ................ G06T 19/006

FOREIGN PATENT DOCUMENTS

| CN | 108 330 792 A | 7/2018 |
|---|---|---|
| EP | 0 834 736 A1 | 4/1998 |
| JP | 62-170809 A | 7/1987 |
| JP | 2004-187220 A | 7/2004 |
| JP | 2006-033282 A | 2/2006 |
| JP | 2014-006885 A | 1/2014 |
| JP | 2014-086826 A | 5/2014 |
| JP | 2017-142613 A | 8/2017 |

OTHER PUBLICATIONS

Office Action dated Oct. 8, 2021 in Chinese Patent Application No. 201980049785.2, 8 pages.

* cited by examiner

COMPARISON EXAMPLE

COMPARISON EXAMPLE

COMPARISON EXAMPLE

COMPARISON EXAMPLE

COMPARISON EXAMPLE

COMPARISON EXAMPLE

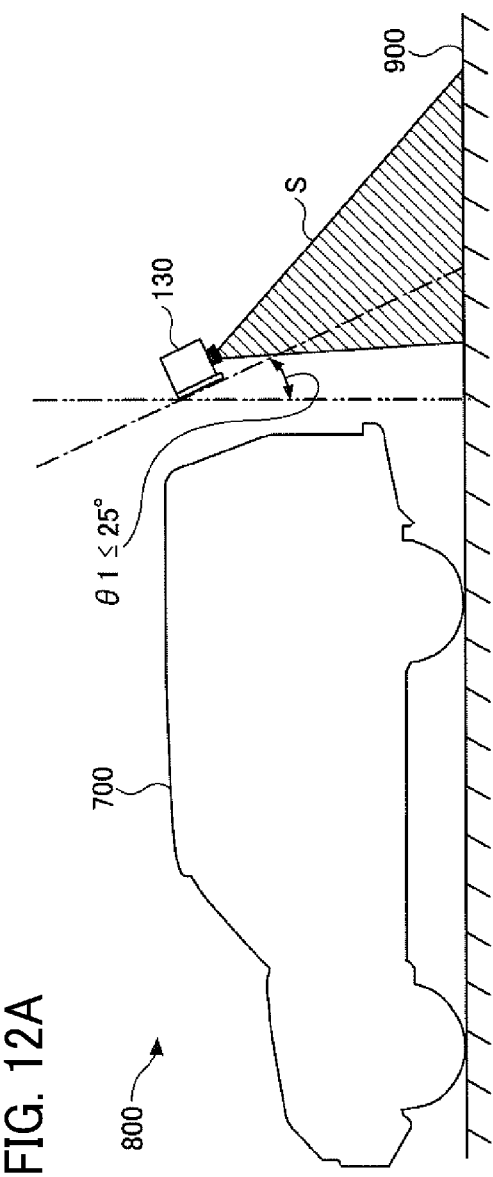

COMPARISON EXAMPLE

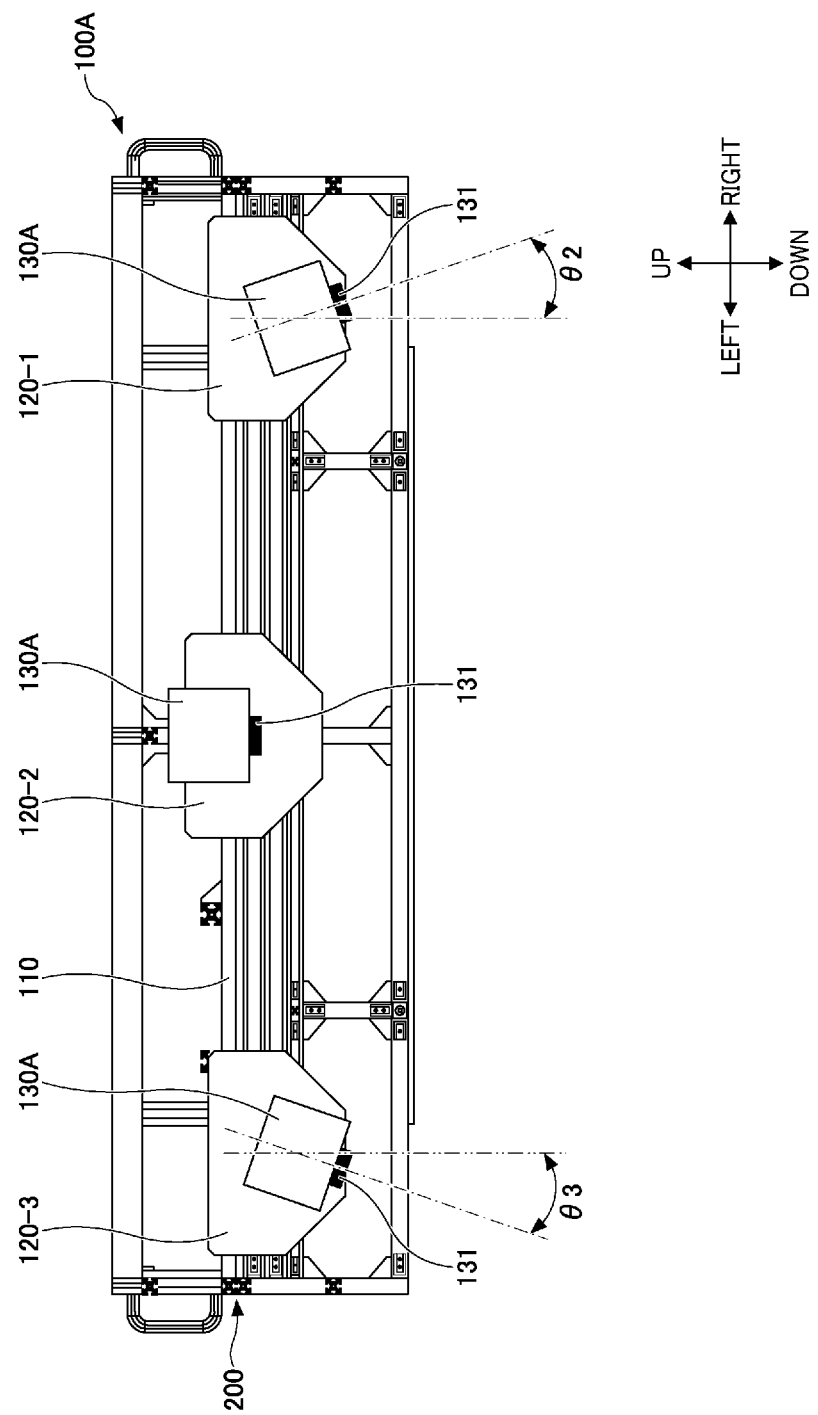

MEASUREMENT APPARATUS, MOVABLE APPARATUS, AND VEHICLE

TECHNICAL FIELD

This disclosure relates to a measurement apparatus, a movable apparatus, and a vehicle.

BACKGROUND

Imaging devices, such as cameras, are attached to movable apparatuses (e.g., vehicles, drones) to devise movable measurement apparatuses that can measure the state or condition of external environment of the movable apparatuses, such as nearby vehicles, road surface conditions, and tunnel surface conditions. The imaging devices used for measuring the state or condition of the external environment can use known cameras, such as cameras having a wide-angle lens, and stereo cameras equipped with a plurality of cameras.

Japanese Patent Laid-Open Application No. 2007-49276-A discloses a vehicle-mounted panorama camera system.

CITATION LIST

Patent Literature

PTL 1: Japanese Patent Application Laid-Open No. 2007-49276-A

SUMMARY

Technical Problem

However, in the configuration disclosed in Japanese Patent Laid-Open Application No. 2007-49276-A, when images of an object (e.g., road surface) in the vicinity of the movable apparatus are captured, an imaging range becomes smaller due to the interference of an imaging range of the camera and the movable apparatus.

The present invention is devised in view of the above issue, and aims to provide a new and useful measurement apparatus, movable apparatus, and vehicle, which can perform the measurement of objects with higher precision and a wider range.

Solution to Problem

Example embodiments of the present invention include a measurement apparatus mountable on a movable apparatus. The measurement apparatus includes a first imaging device configured to capture an image in a first image capture direction, the first image capture direction having a first angle with respect to a direction of travel of the movable apparatus, and a second imaging device disposed next to the first imaging device configured to capture an image in a second image capture direction, the second image capture direction having a second angle with respect to the direction of travel of the movable apparatus. The first imaging device and the second imaging device are disposed to overlap at least partially a first imaging range of the first imaging device and a second imaging range of the second imaging device. At least one of the first image capture direction of the first imaging device and the second image capture direction of the second imaging device is set at a given angle with respect to a width dimension of the movable apparatus.

Example embodiments of the present invention include a measurement apparatus mountable on a movable apparatus. The measurement apparatus includes a plurality of imaging devices including at least three imaging devices, each configured to capture an image in an image capture direction having a given angle with respect to a direction of travel of the movable apparatus. At least two adjacent imaging devices of the plurality of imaging devices are disposed to overlap at least partially imaging ranges of the adjacent imaging devices, and an image capture direction of at least one of the imaging devices is set at a given angle with respect to a width dimension of the movable apparatus while an image capturing direction of other one or more of the imaging devices, other than the at least one imaging device having the image capture direction set with the given angle, is not set at the given angle with respect to the width dimension of the movable apparatus.

Example embodiments of the present invention include a measurement apparatus mountable on a movable apparatus. The measurement apparatus includes a plurality of imaging devices including at least a first imaging device and a second imaging device. The first imaging device is disposed closer to an imaging target than the second imaging device. A first image capture range of the first imaging device and a second image capture range of the second imaging device at least partially overlap at the imaging target. When a first inclination angle "$\theta 2A$" of the first imaging device with respect to a width dimension of the movable apparatus is defined by a first image capture direction of the first imaging device and a perpendicular line extended perpendicularly from the imaging target, and a second inclination angle "$\theta B$" of the second imaging device with respect to the width dimension of the movable apparatus is defined by a second image capture direction of the second imaging device and the perpendicular line extended perpendicularly from the imaging target, the first inclination angle "$\theta 2A$" and the second inclination angle "$\theta B$" satisfy a condition of "$\theta 2A > \theta B$."

Advantageous Effects of Invention

According to preferred embodiments of the present invention, a new and useful measurement apparatus, movable apparatus, and vehicle that can perform the measurement of objects with higher precision and a wider range can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 1A and 1B are example views of a movable measurement apparatus according to a first embodiment, in which FIG. 1A is a side view of the movable measurement apparatus, and FIG. 1B is a perspective view of the movable measurement apparatus viewed from a rear side.

FIGS. 10A and 10B are schematic views of a layout of cameras in a measurement apparatus, in which FIG. 10A is a schematic view of a layout of stereo cameras according to the first embodiment, and FIG. 10B is a schematic view of a layout of cameras of a comparison example.

FIGS. 12A and 12B are schematic side views of a layout of a camera in a measurement apparatus, in which FIG. 12A indicates a layout of a stereo camera according to the first embodiment, and FIG. 12B indicates a layout of a camera of a comparison example.

FIGS. 13A and 13B are schematic views of an effective working distance of a measurement apparatus according to the first embodiment, in which FIG. 13A is a rear view of the measurement apparatus viewed from a rear side, and FIG. 13B is a perspective view of the measurement apparatus viewed from the rear side.

FIG. 14 is a cross-sectional view of a measurement apparatus according to a second embodiment, which is viewed from a rear side of the measurement apparatus.

DESCRIPTION OF EMBODIMENTS

Figure 1A:
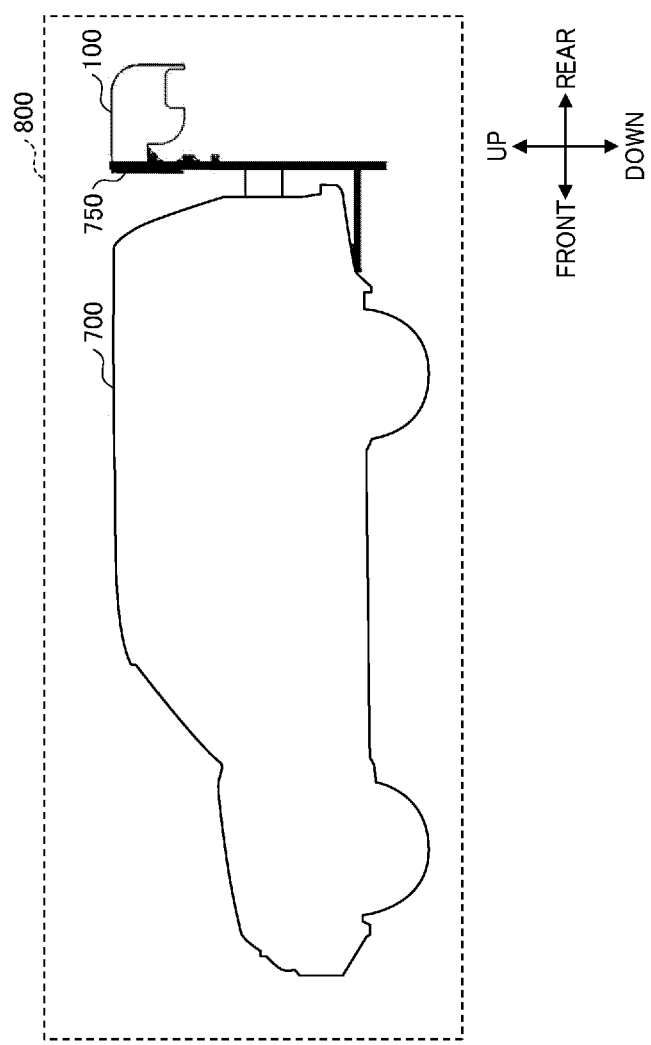

Hereinafter, a description is given of one or more embodiments of the present invention. In this description, the same reference numerals are given to the same components, and description thereof will be omitted.

Figure 1B:
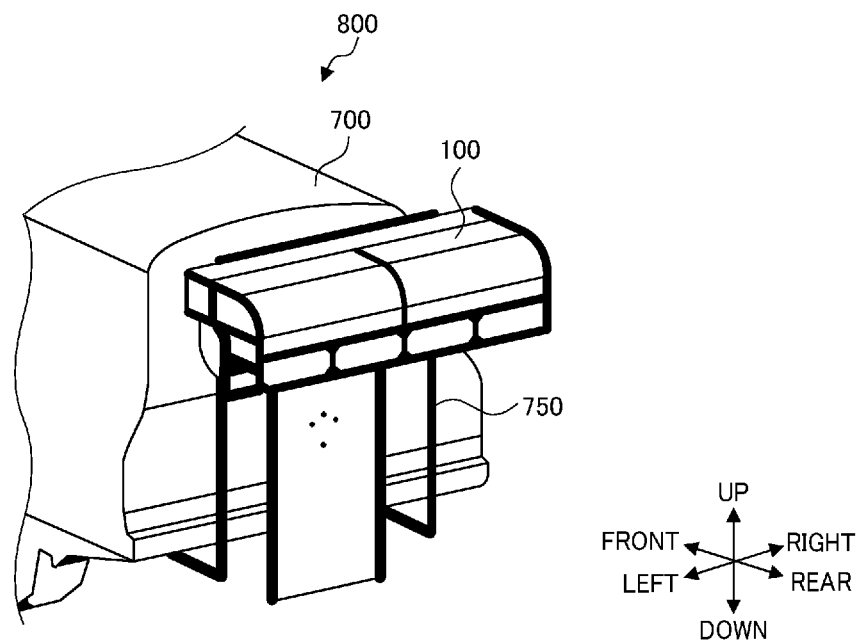
Figure 2:
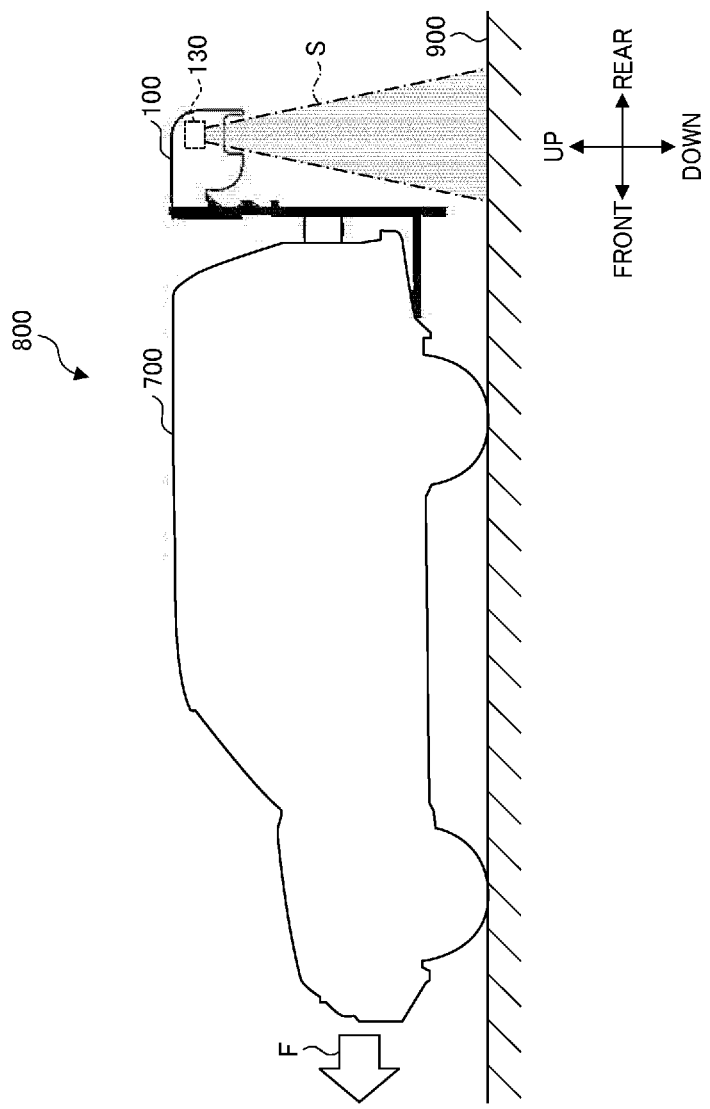
FIG. 2 is a scheme of measurement processing of a movable measurement apparatus according to the first embodiment.

Hereinafter, a description is given of a movable measurement apparatus 800 including a measurement apparatus 100 according to a first embodiment with reference to FIGS. 1 and 2. The movable measurement apparatus 800 can also be referred to as the measurement apparatus or measurement system. FIGS. 1A and 1B (FIG. 1) are example views of the movable measurement apparatus 800 including the measurement apparatus 100 according to the first embodiment. FIG. 1A is a side view of the movable measurement apparatus 800. FIG. 1B is a perspective view of the movable measurement apparatus 800 viewed from the rear side of the movable measurement apparatus 800. FIG. 2 is a scheme of measurement processing of the movable measurement apparatus 800.

In the descriptions of FIGS. 1 and 2 and other descriptions in this disclosure, a direction of travel of the vehicle 700 is referred to as a traveling direction of the vehicle 700, and the traveling direction of the vehicle 700 is referred to as a forward direction or forward traveling direction, a direction opposite to the forward direction is referred to as a rearward direction or rearward traveling direction, the gravity direction is referred to as a downward direction, a direction opposite to the gravity direction is referred to as an upward direction, a horizontal right direction with respect to the traveling direction is referred to as a right direction, and a horizontal left direction with respect to the traveling direction is referred to as a left direction.

As illustrated in FIGS. 1 and 2, the movable measurement apparatus 800 includes, for example, the vehicle 700 (an example of movable apparatus), a mount 750 attached to the vehicle 700, and the measurement apparatus 100 mounted on the vehicle 700 using the mount 750.

As to the movable measurement apparatus 800 illustrated in FIGS. 1 and 2, the mount 750 is attached at the rear end of the vehicle 700, and a trajectory S of an optical path of a stereo camera 130 (an example of imaging device) disposed in the measurement apparatus 100 is substantially directed to the downward direction as illustrated in FIG. 2. With this configuration, the movable measurement apparatus 800 can use the stereo camera 130 disposed in the measurement apparatus 100 to capture images of a road surface 900 while the vehicle 700 is moving in a forward direction F (see FIG. 2) to measure the unevenness (irregularities) and the state of the road surface 900 (e.g., whether lane line has disappeared or not), which is a measurement target or imaging target in this description.

More specifically, the movable measurement apparatus 800 can be used to measure road surface properties of "crack ratio, rutting, and flatness (irregularities along the traveling direction). Based on the measured road surface properties, the maintenance control index (MCI) can be calculated. Typically, the MCI is used for quantitatively evaluating the pavement serviceability based on the road surface properties, such as "crack ratio, rutting, and flatness." The MCI can be calculated by a personal computer (PC) or tablet device, which is an external device disposed outside the vehicle 700, which receives measurement data after the measurement processing from the vehicle 700, or can be calculated while the vehicle 700 is moving on the road surface 900 by the PC disposed inside the vehicle 700.

Further, instead of the rear end of the vehicle 700, the mount 750 can be attached to any side of the vehicle 700, such as a front end of the vehicle 700 or a side end of the vehicle 700, which is a face provided with a door.

Figure 3:
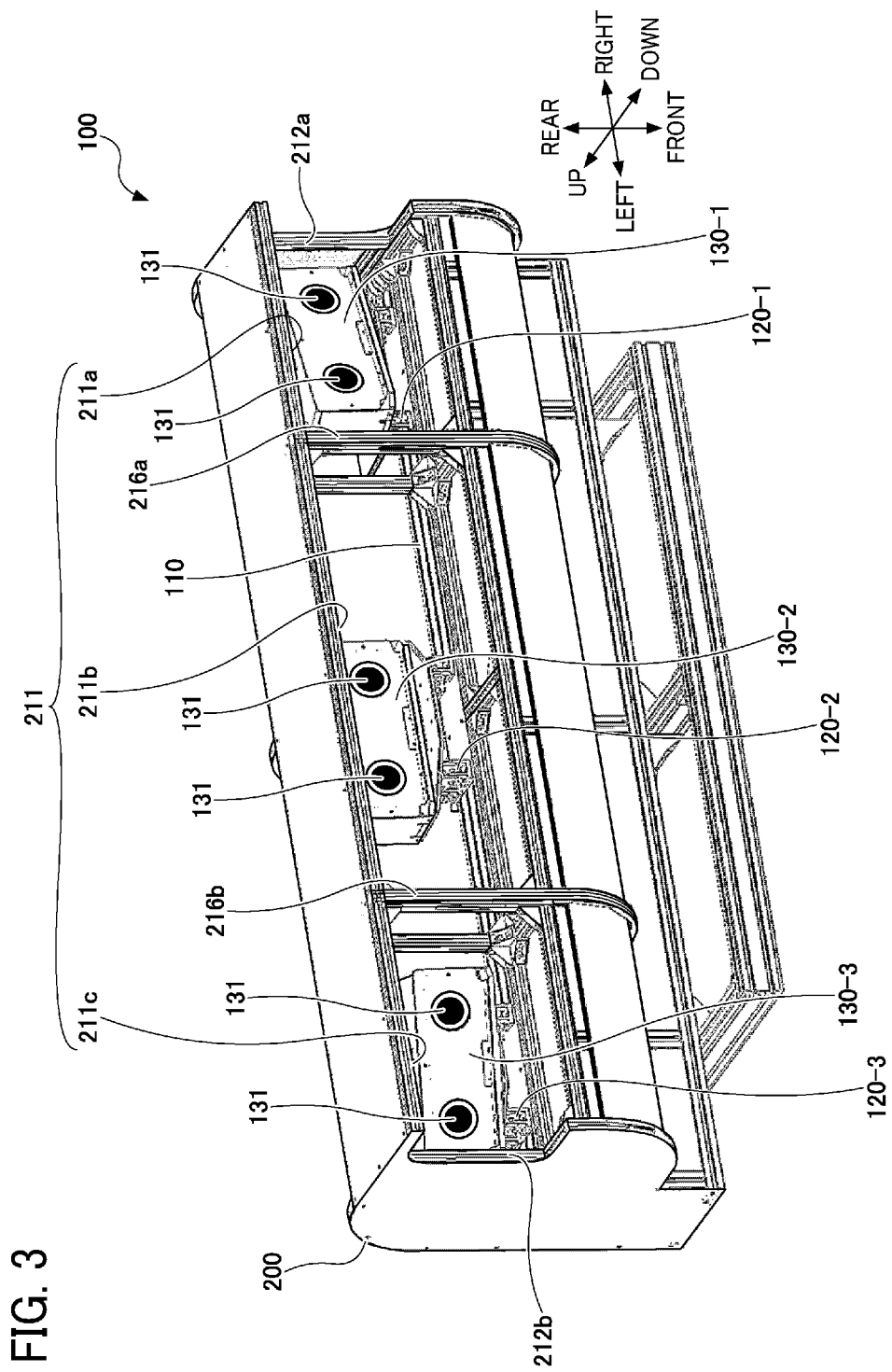
FIG. 3 is a perspective view of a measurement apparatus viewed from a lower side of the measurement apparatus according to the first embodiment.
Figure 4:
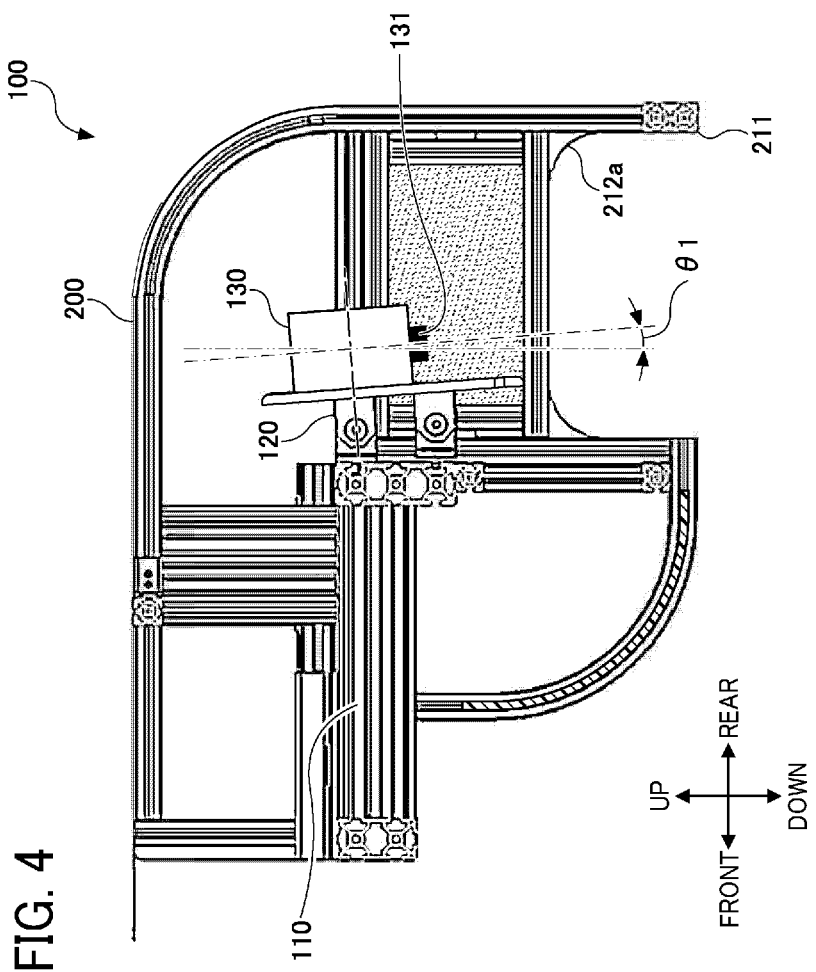
FIG. 4 is a cross-sectional view of a measurement apparatus viewed from a side of the measurement apparatus according to the first embodiment.
Figure 5:
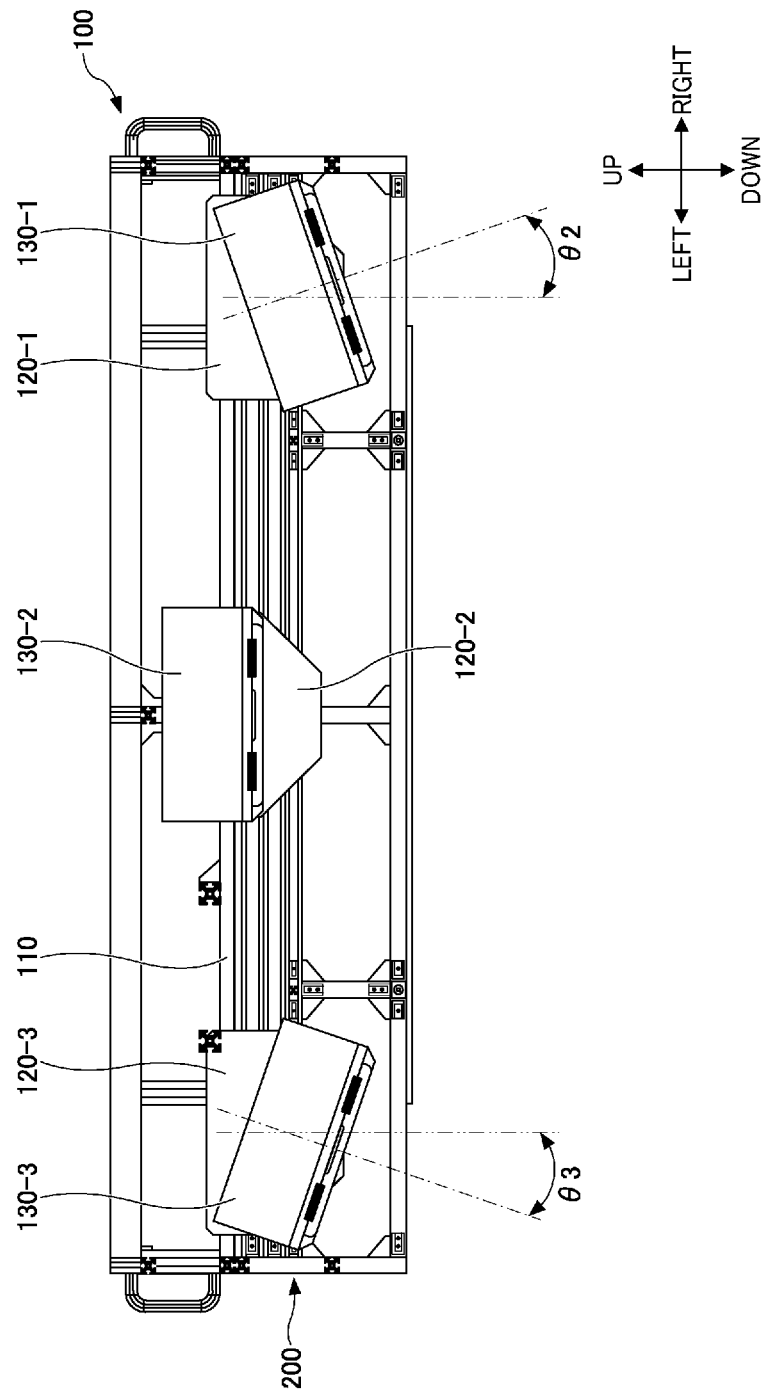
FIG. 5 is a cross-sectional view of a measurement apparatus viewed from a rear side of the measurement apparatus according to the first embodiment.

Hereinafter, a description is given of the measurement apparatus 100 according to the first embodiment with reference to FIGS. 3 to 5. FIG. 3 is a perspective view of the measurement apparatus 100 viewed from a lower side of the measurement apparatus 100. FIG. 4 is a cross-sectional view of the measurement apparatus 100 viewed from a side of the measurement apparatus 100. FIG. 5 is a cross-sectional view of the measurement apparatus 100 viewed from a rear side of the measurement apparatus 100.

As illustrated in FIG. 3, the measurement apparatus 100 includes, for example, a base frame 110, a camera mount 120, a stereo camera 130, and a protection cover unit 200. The measurement apparatus 100 includes, for example, a plurality of stereo cameras 130 to acquire measurement data in a wider range. As illustrated in FIG. 3, the measurement apparatus 100 can include, for example, three stereo cameras 130 (130-1, 130-2, 130-3), and the three stereo cameras 130 are attached to the three camera mounts 120 (120-1, 120-2, 120-3), respectively. Further, one end of the base frame 110 is fixed to the mount 750 (see FIG. 1) while the camera mount 120 is attached to the other end of the base frame 110. The camera mount 120 secures the stereo camera 130 used as the imaging device. Further, the camera mount 120 can be provided with an angle adjustment mechanism for adjusting an image capturing angle of the stereo camera 130.

The stereo camera 130, which is a camera having two lenses 131, can measure a range or distance to the measurement target by processing acquired image data. In this description, the imaging device provided for the measurement apparatus 100 employs the stereo camera 130, but not limited thereto. For example, in a case of checking the state or condition of an object, a camera having a monocular lens can be used as the imaging device. Further, the number of imaging devices provided for the measurement apparatus 100 is not limited to three, but can be two, or four or more. By including a plurality of imaging devices in the measurement apparatus 100, measurement data can be acquired from a wider range. Further, by employing a wide-angle lens having a focal length of 35 mm or less as the lens 131 of the stereo camera 130, the measurement data can be acquired from a wider range. Hereinafter, the term of the stereo camera 130 may mean one or more stereo cameras 130 in this description.

The protection cover unit 200, formed of, for example, a resin plate and an aluminum frame supporting the resin plate, is formed into a box-like shape having an opening portion 211 (including sub-opening portions 211a, 211b, 211c) on the lower side of the protection cover unit 200, in which the lower side corresponds to an image capture direction of the imaging devices. The stereo camera 130 is disposed in the inner space of the protection cover unit 200.

Further, the protective cover unit 200 has a side opening portion 212a and a side opening portion 212b (see FIG. 3), in which the side opening portion 212a is formed from the lower end of the right side while the side opening portion 212b is formed from the lower end of the left side. Further, the opening portion 211 communicates with the side opening portion 212a to together form one opening space, and the opening portion 211 communicates with the side opening portion 212b to together form one opening space. Thus, one opening space is formed in the protection cover unit 200 from the right side to the left side through the lower side by the opening portion 211 and sub-opening portions 212a and 212b.

Further, frames 216a and 216b are provided at positions that do not interfere with trajectories of optical paths of the stereo cameras 130 (see S-1 to S-3 in FIG. 9), which will be described later. In an example case of FIG. 3, the lower side of the opening portion 211 is partitioned by the frames 216a and 216b to form the three sub-opening portions 211a, 211b and 211c, but the frames 216a and 216b can be omitted in some cases.

Further, the protection cover unit 200 can be provided with a protection member that can cover the sub-opening portions 211a, 211b and 211c. By covering the sub-opening portions 211a, 211b and 211c using the protection member, the stereo camera 130 disposed inside the protection cover unit 200 can be protected from external disturbance when the measurement is not performed.

As illustrated in FIG. 4, the image capture direction of the stereo camera 130 (130-1, 130-2, 130-3) is set with a given angle "θ1" with respect to a traveling direction (front-rear direction) of the vehicle 700 (see FIG. 1). In other words, when the measurement apparatus 100 is viewed from the width dimension (width direction) of the vehicle 700 as illustrated in FIG. 4, the image capture direction of the stereo camera 130 is set with the given angle "θ1" (dashed single-dot line in FIG. 4) with respect to the vertical direction or downward direction (dashed double-dot line in FIG. 4) to the rearward in the traveling direction of the vehicle 700, which means that the stereo camera 130 is inclined with respect to the vertical direction to the rearward in the traveling direction of the vehicle 700. Further, if the measurement apparatus 100 is mounted at the front end of the vehicle 700, the image capture direction of the stereo camera 130 can be inclined with respect to the vertical direction to the forward direction in the traveling direction of the vehicle 700 by setting a given angle.

Further, as illustrated in FIG. 5, among the plurality of stereo cameras 130, the image capture directions of the stereo cameras 130-1 and 130-3 are inclined with respect to the width direction (width dimension in the left-right direction) of the vehicle 700 by setting a given angle "θ2" for the stereo cameras 130-1 and a given angle "θ3" for the stereo cameras 130-3, respectively. In other words, when the measurement apparatus 100 is viewed from the front-rear direction, each of the image capture directions of the stereo cameras 130-1 and 130-3 (dashed single-dot line in FIG. 5) is inclined with respect to the vertical direction (dashed double-dot line in FIG. 5) outward in the width direction (width dimension in left-right direction) of the vehicle 700 by setting the given angles "θ2" and "θ3," respectively, as illustrated in FIG. 5. The given angles "θ2" and "θ3" respectively set for the stereo cameras 130-1 and 130-3 can be the same angle or different angles.

On the other hand, the image capture direction of the stereo cameras 130-2 is not set with a given angle with respect to the width direction (width dimension in left-right direction) of the vehicle 700 as illustrated in FIG. 5. In other words, when the measurement apparatus 100 is viewed from the front-rear direction, the image capture direction of the stereo camera 130-2 is aligned in the vertical direction (up-down direction), which corresponds to the line perpendicularly extended from the measurement target, such as the road surface 900.

Figure 6:
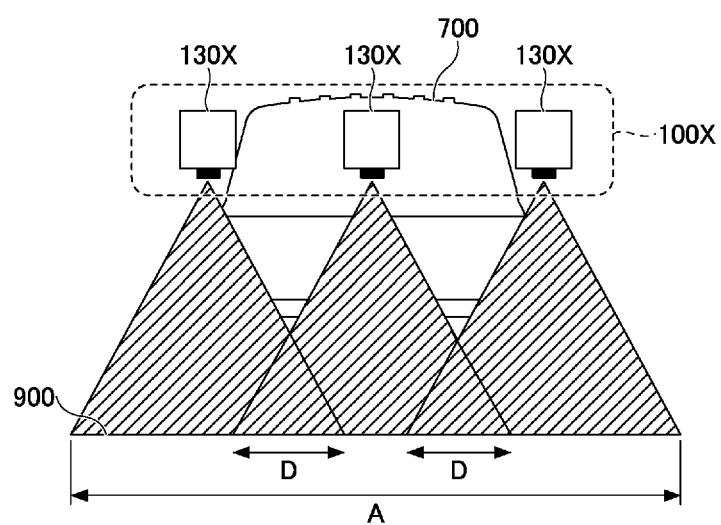
FIG. 6 is a schematic view of a rear side of a measurement apparatus of a comparison example.
Figure 7A:
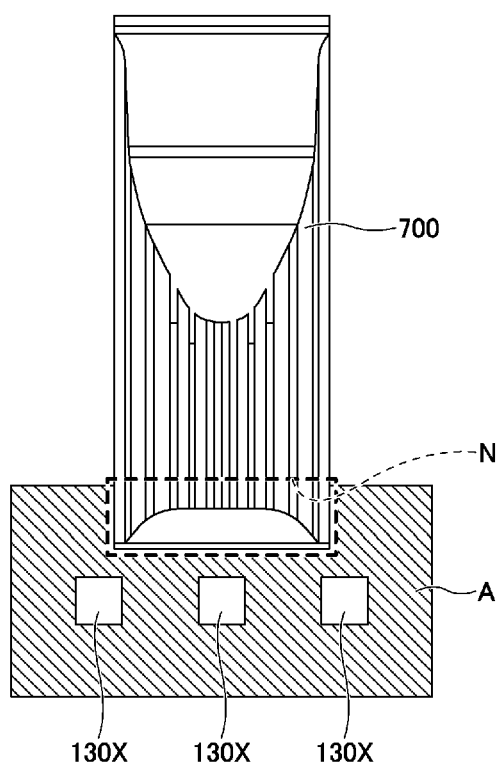
FIGS. 7A and 7B are schematic views of an upper side of a measurement apparatus of a comparison example.
Figure 7B:
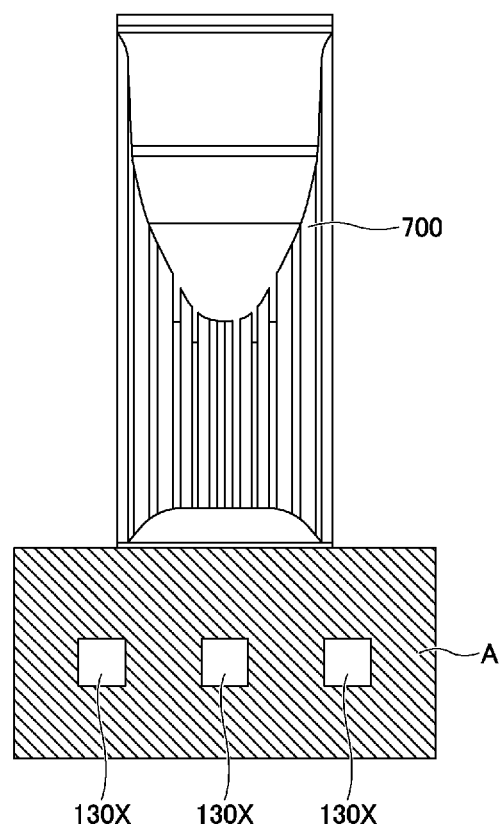
Figure 8A:
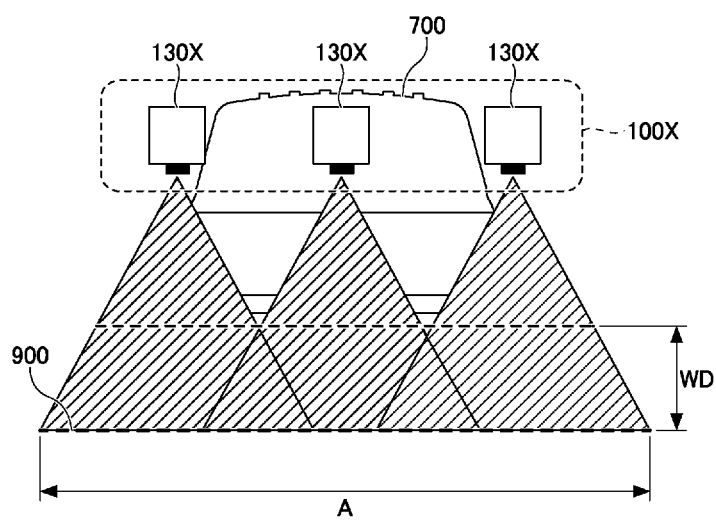
FIGS. 8A and 8B are schematic views of a rear side of a measurement apparatus of the comparison example.
Figure 8B:
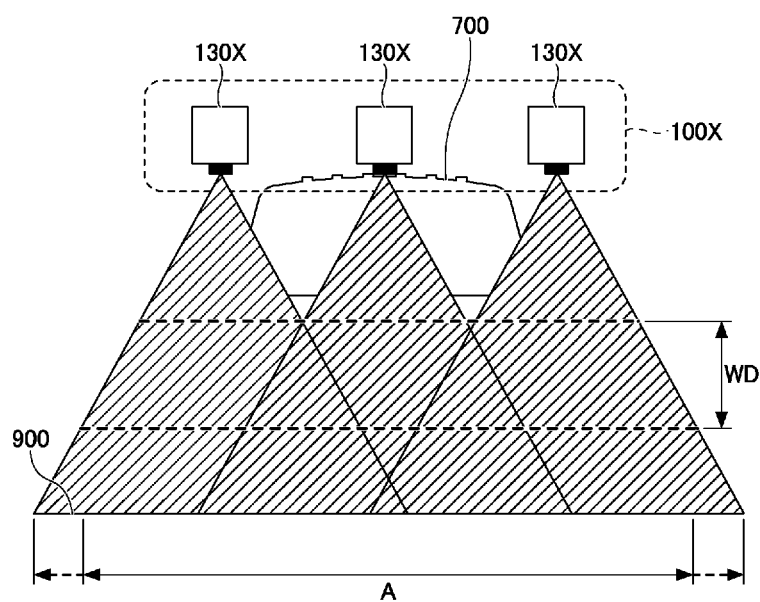

Hereinafter, a description is given of the measurement apparatus 100 according to the first embodiment by comparing with a measurement apparatus 100X of a comparison example with reference to FIGS. 6, 7 and 8. FIG. 6 is a schematic view of a rear side of the measurement apparatus 100X of the comparison example. FIGS. 7A and 7B (FIG. 7) are schematic views of an upper side of the measurement apparatus 100X of the comparison example. FIGS. 8A and 8B (FIG. 8) are schematic views of a rear side of the measurement apparatus 100X of the comparison example. In FIGS. 6, 7 and 8, the configuration of the measurement apparatus 100X is simplified by indicating the position of the camera 130X used as the imaging device alone.

As illustrated in FIG. 6, when a plurality of cameras 130X is used to capture images of an object (e.g., road surface 900) with a wider range, an image capture range of one camera 130X and another image capture range of another camera 130X are overlapped as an overlapping region D. In this configuration, if an imaging range A in the width direction of the measurement apparatus 100X is to be set wider by setting a greater interval between the cameras 130X in the width direction, a size of the measurement apparatus 100X becomes larger in the width direction, which is not preferable.

As illustrated in FIG. 7A, when images of the object (e.g., road surface 900) are captured using the plurality of cameras 130X in a wider range, a part of the vehicle 700 may interfere with a part of the imaging range A to become an interference area N. In this case, the measurement apparatus 100X cannot capture images of the road surface 900 corresponding to the interference area N, with which the imaging range A of the object (e.g., road surface 900) becomes smaller due to the interference area N. On the other hand, as illustrated in FIG. 7B, if the plurality of cameras 130X are disposed at a position away from the rear end of the vehicle 700 to avoid the interference between the imaging range A and the vehicle 700, the measurement apparatus 100X becomes larger in the front-rear direction, which is not preferable.

Hereinafter, a description is given of a working distance between an external face of the lens of the camera 130 or 130X and a to-be-measured object (measurement target). Specifically, a distance range from the shortest working distance to the longest working distance that can achieve a given measurement accuracy is referred to as an effective working distance WD in this description. The effective working distance WD corresponds to, for example, a range of recommended shooting distance and recommended operation distance specified in catalogs of cameras. If the distance between the camera 130 (or 130X) and the measurement target (e.g., road surface 900) is within the range of the effective working distance WD, images having higher image quality can be obtained in the imaging range. By contrast, if the distance between the camera 130 (or 130X) and the measurement target (e.g., road surface 900) is deviated outside the effective working distance WD (if the distance between the camera 130 (or 130X) and the measurement target becomes longer or shorter than the effective working distance WD), the measurement accuracy deteriorates due to defective images, such as blurring of images.

For example, if a structure of the measurement apparatus 100X illustrated in FIG. 8A is changed to a structure of the measurement apparatus 100X illustrated in FIG. 8B by setting a greater distance between the camera 130X and the object (e.g., road surface 900) to enlarge a size of the imaging range A, the image capture range A on the road surface 900 is deviated from the effective working distance WD of the camera 130X as illustrated in FIG. 8B, with which defective image (e.g., image blurring) occurs.

Figure 9:
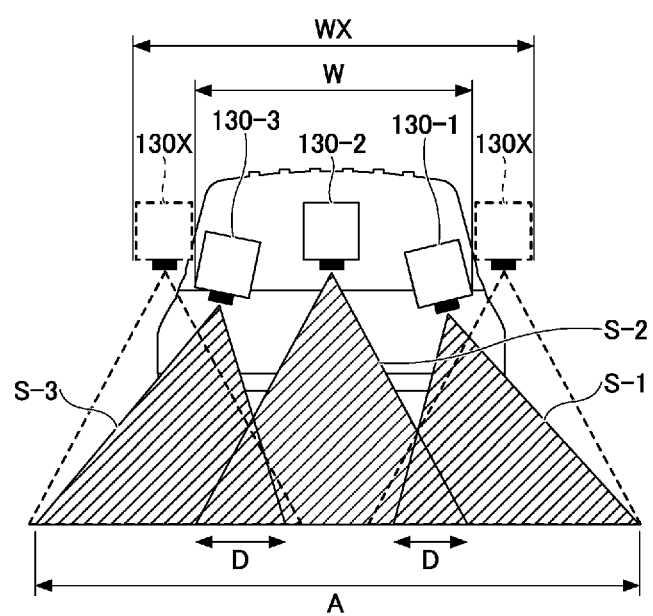
FIG. 9 is a schematic view of an imaging range of a measurement apparatus according to the first embodiment.

FIG. 9 is a schematic view of the imaging range of the measurement apparatus 100 according to the first embodiment. In FIG. 9, the configuration of the measurement apparatus 100 is simplified by indicating the positions of the stereo cameras 130 used as the imaging devices alone. Further, the trajectory of the optical path S-1 of the stereo camera 130-1, the trajectory of the optical path S-2 of the stereo camera 130-2, and the trajectory of the optical path S-3 of the stereo camera 130-3 are indicated with the hatching in FIG. 9. Further, the positions of the cameras 130X disposed at both outer ends of the measurement apparatus 100X of the comparison example (see FIG. 6) are also illustrated using the dashed lines in FIG. 9.

As illustrated in FIG. 5, as to the measurement apparatus 100 according to the first embodiment, each of the image capture directions of the stereo cameras 130-1 and 130-3 is inclined outward in the width direction of the vehicle 700 by setting the given angles "θ2" and "θ3," respectively. With this configuration, as illustrated in FIG. 9, the stereo cameras 130-1 and 130-3 disposed at the outer positions in the width direction of the vehicle 700 can be disposed at relatively inner positions in the width direction of the vehicle 700 compared to the positions of the stereo cameras 130X (see dashed lines in FIG. 9) while securing the imaging range A comprised with one overlapping region D formed by an image capture range of the stereo camera 130-2 and an image capture range of the stereo camera 130-1 and another overlapping region D formed by the image capture range of the stereo camera 130-2 and an image capture range of the stereo camera 130-3. With this configuration, the size of the measurement apparatus 100 can be set smaller compared to the size of the measurement apparatus 100X, in particular, a width W of the measurement apparatus 100 can be set smaller compared to a width WX of the measurement apparatus 100X, with which the size of the measurement apparatus 100 can be reduced.

Figure 10A:
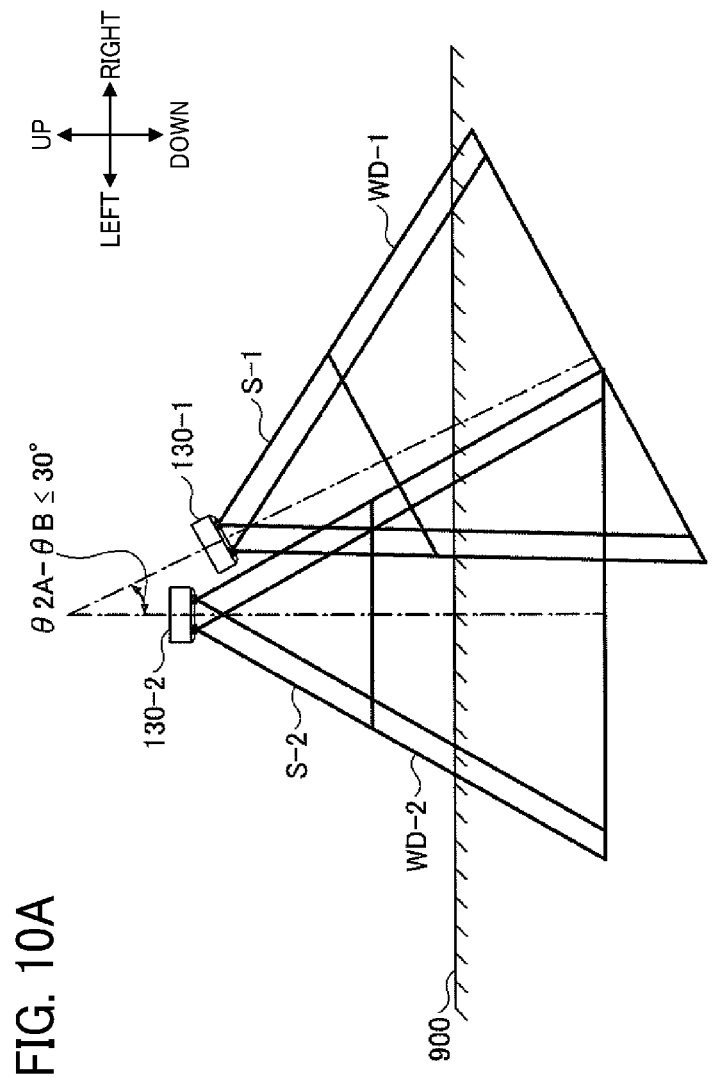
Figure 10B:
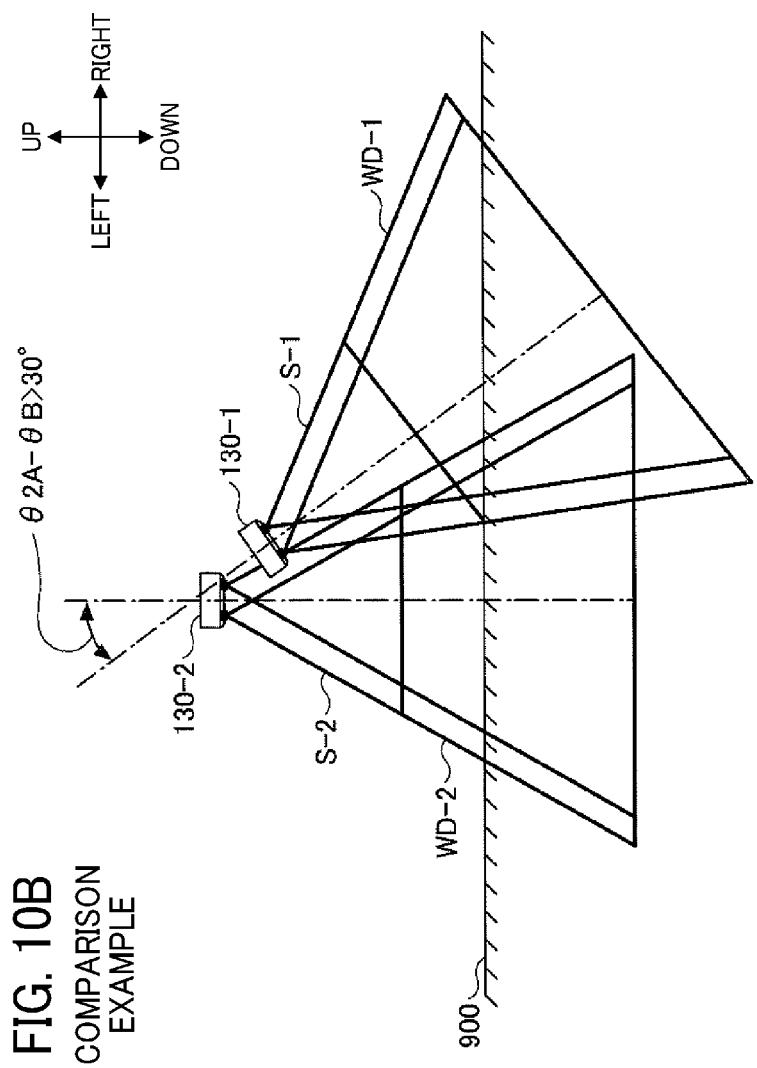

Hereinafter, a description is given of an layout or arrangement of the stereo cameras 130 in the measurement apparatus 100 with reference to FIGS. 10A and 10B (FIG. 10). FIGS. 10A and 10B (FIG. 10) are schematic views of a layout of the stereo cameras 130 in the measurement apparatus 100. FIG. 10A is a schematic view of a layout of the stereo cameras 130 according to the first embodiment. FIG. 10B is a schematic view of a layout of the stereo cameras 130 of a comparison example. In FIGS. 10A and 10B, the vehicle 700, the mount 750, and the exterior components of the measurement apparatus 100 are not illustrated while the stereo cameras 130-1 and 130-2 alone are illustrated.

As illustrated in FIGS. 10A and 10B, each of the stereo cameras 130-1 and 130-2 can be inclined with respect to the road surface 900 with a given inclination angle. The given inclination angle can be defined by the image capture direction of the stereo camera 130 (dashed single-dot line in FIG. 10) and a line perpendicular to the measurement target, such as the road surface 900. The line perpendicular to a surface of the measurement target is referred to as the perpendicular line in this description.

As illustrated in FIGS. 10A and 10B, one camera (e.g., stereo camera 130-1) is inclined with respect to the perpendicular line extending from the road surface 900 with a first inclination angle "θ2A" while another camera (e.g., stereo camera 130-2), adjacent to the one camera, is inclined with respect to the perpendicular line extending from the road surface 900 with a second inclination angle "θB."

In an example case of FIG. 10A, the stereo camera 130-1 is inclined with respect to the perpendicular line with the first inclination angle "θ2A," such as 30 degrees (30°), outward in the width direction of the vehicle 700, which means that the image capture direction of the stereo camera 130-1 is inclined outward in the width direction of the vehicle 700 with the first inclination angle "θ2A."

Further, in an example case of FIG. 10A, the stereo camera 130-2, adjacent to the stereo camera 130-1, is not inclined with respect to the perpendicular line but is aligned with the perpendicular line, which means that the stereo camera 130-2 is inclined with respect to the perpendicular line by setting the second inclination angle "θB" to zero degrees (0°) (θB=0°), and thereby the stereo camera 130-2 is not inclined with respect to the perpendicular line, and the image capture direction of the stereo cameras 130-2 is not inclined with respect to the width direction of the vehicle 700.

As described above, since the image capture direction of the stereo camera 130-1 (or 130-3) is inclined outward in the width direction of the vehicle 700, the first inclination angle "θ2A" and the second inclination angle "θB" can satisfy a following condition (1) in the embodiment.

$$\theta 2 > \theta B \quad (1)$$

Preferably, the first inclination angle "θ2A" of one camera (e.g., stereo camera 130-1) and the second inclination angle "θB" of adjacent another camera (e.g., stereo camera 130-2) satisfy a following condition (2) in the embodiment.

$$|\theta 2 - \theta B| \leq 30° \quad (2)$$

In the configuration of the embodiment, the stereo camera 130-1 is rotatable about a rotation center set at a given position, with which the size of the measurement apparatus 100 can be reduced while setting the imaging range A within the effective working distance WD. However, as illustrated in FIG. 10B, if the first inclination angle "θ2A" of the stereo camera 130-1 is increased too much, the positions of the stereo camera 130-1 and the adjacent stereo camera 130-2 become too close to each other, with which the stereo camera 130-1 enters in the image capture range (i.e., field of view) of the adjacent stereo camera 130-2, and thereby the stereo camera 130-2 captures an image of the stereo camera 130-1, which causes a problem.

By setting the condition (2) of "|θ2A−θB|≤30°" as above described, the stereo camera 130-2 does not capture the image of the stereo camera 130-1, adjacent to the stereo camera 130-2, while setting the imaging range A within the effective working distance WD and reducing the size of the measurement apparatus 100.

In this specification, the first inclination angle "θ2A" of the stereo camera 130 corresponds to the given angles "θ2" or "θ3" of the stereo camera 130 indicated in FIG. 5 and FIGS. 14 to 18 in this this specification, and the second inclination angle "θB" of the stereo camera 130, which is set to zero degrees (0°), in FIG. 5 and FIGS. 14 to 18 to be described later in this this specification.

Further, as illustrated in FIG. 10A (and FIG. 5), the stereo cameras 130-1 and 130-3 disposed at both outer sides in the width direction of the vehicle 700 are installed at a lower position compared to the stereo camera 130-2 disposed at the center in the width direction of the vehicle 700. With this configuration, every one of the stereo cameras 130-1, 130-2, and 130-3 used in the measurement apparatus 100 can employ the same camera having the same effective working distance WD. In other words, different types of camera are not disposed for the measurement apparatus 100, with which the cost of the measurement apparatus 100 can be reduced. As to the measurement apparatus 100 of the first embodiment, the height difference between the stereo cameras 130-1 and 130-3 at the both outer sides and the stereo camera 130-2 at the center is set, for example, to 200 mm.

Figure 11:
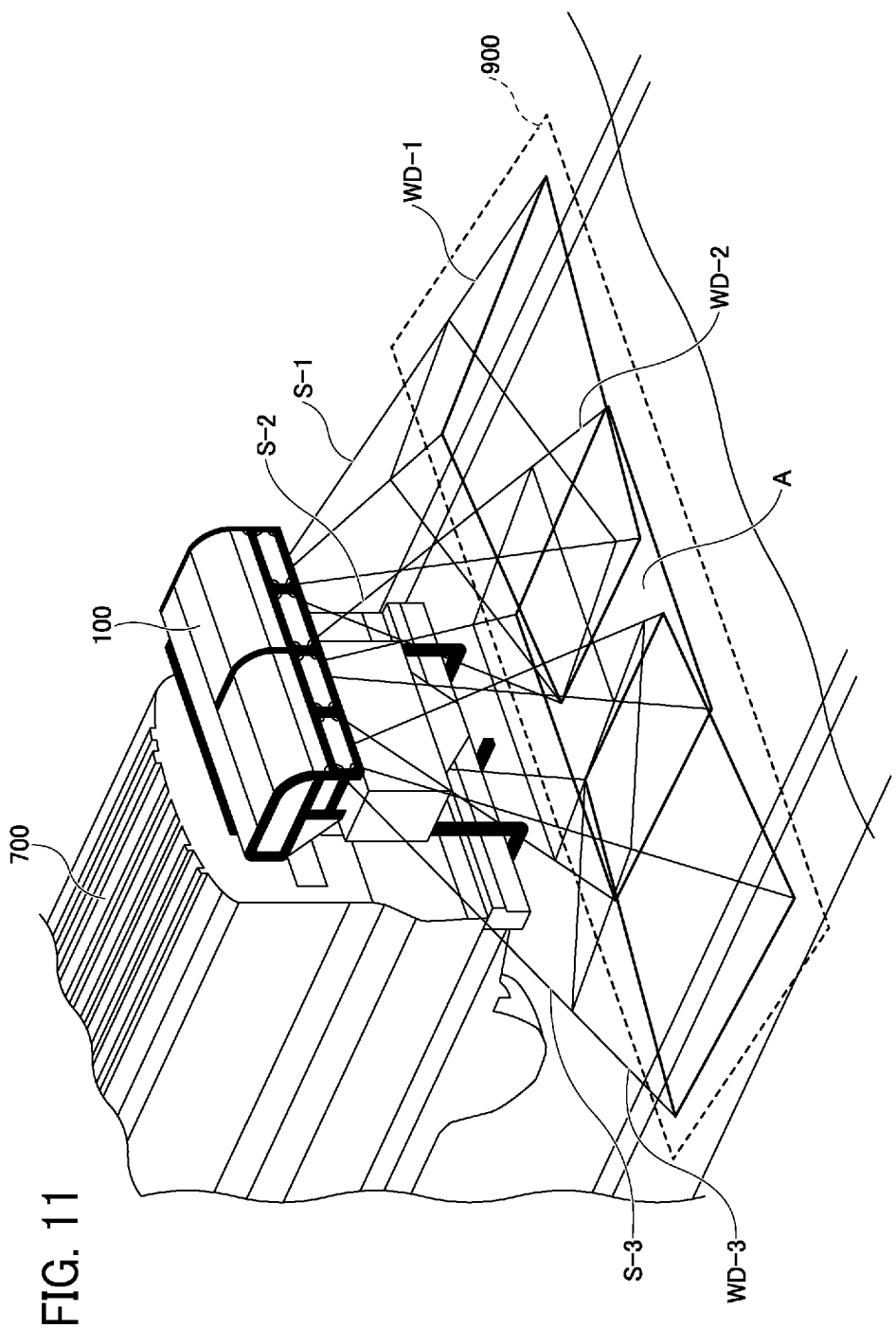
FIG. 11 is a perspective view of an image capture range of a measurement apparatus according to the first embodiment.

FIG. 11 is a perspective view of the image capture range of the measurement apparatus 100 according to the first embodiment. As illustrated in FIG. 4, as to the measurement apparatus 100 according to the first embodiment, each of the image capture directions of the stereo cameras 130 (130-1, 130-2, 130-3) is set whit the given angle with the rearward traveling direction of the vehicle 700. With this configuration, as illustrated in FIG. 11, the trajectory of the optical path S-1 of the stereo camera 130-1, the trajectory of the optical path S-2 of the stereo camera 130-2 and the trajectory of the optical path S-3 of the stereo camera 130-3 can be shifted rearward in the traveling direction of the vehicle 700, with which the interference between the imaging range A and the vehicle 700 can be avoided, and the size reduction of the imaging range A on the road surface 900 can be prevented.

Figure 12B:
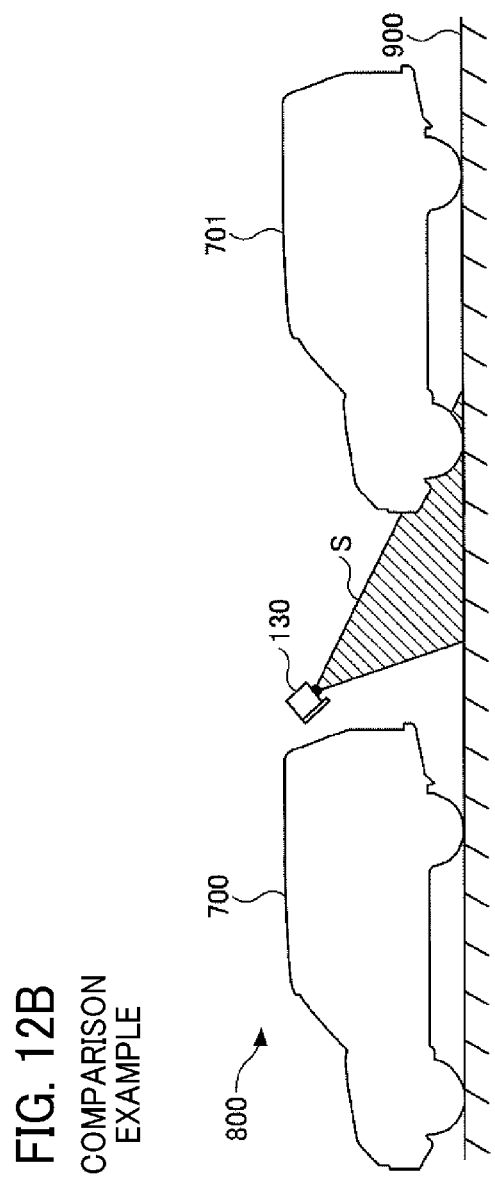

FIGS. 12A and 12B (FIG. 12) are schematic side views of the layout of the stereo camera 130 in the measurement apparatus 100. FIG. 12A indicates a layout of the stereo camera 130 of the first embodiment. FIG. 12B indicates a layout of the stereo camera 130 of a comparison example. In FIG. 12, the mount 750 and the exterior components of the measurement apparatus 100 are not illustrated.

As illustrated in FIG. 12A, the given angle "θ1" (see FIG. 4) of the stereo camera 130 with respect to the rearward traveling direction of the vehicle 700 is set, preferably, with a following condition (3) such as "θ1" is set 25 degrees (25°) or less.

$$\theta 1 \leq 25° \quad (3)$$

If a vehicle-to-vehicle distance between the vehicle 700 (i.e., movable measurement apparatus 800) and a following vehicle 701 that is behind the vehicle 700 (called "behind vehicle) becomes closer during the travelling of the vehicle 700 or a stop of the vehicle 700 at a traffic signal, as illustrated in FIG. 12B, the behind vehicle 701 may enter the field of view of the stereo camera 130, with which the measurement of the road surface 900 cannot be performed correctly.

By setting the condition (3) of "θ1≤25°" as above described, the interference with the behind vehicle 701 can be reduced, in particular, prevented. In the embodiment, even if the vehicle-to-vehicle distance between one vehicle and another behind vehicle becomes approximately 2 m, the field of view of the stereo camera 130 can be effectively secured by setting the condition (3).

Figure 13A:
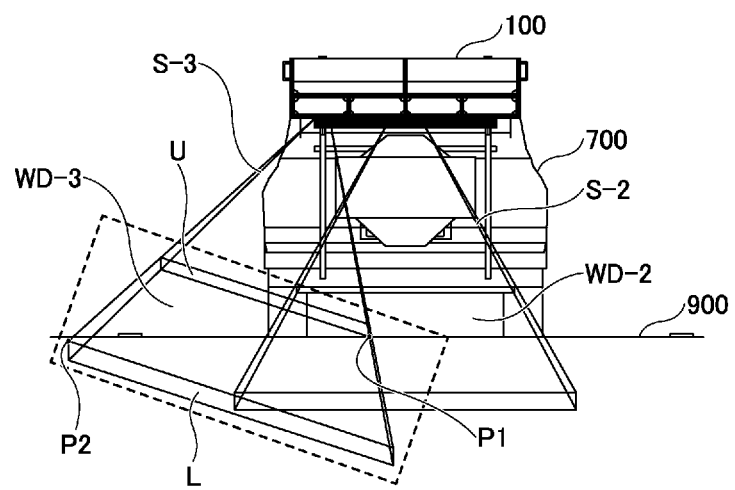
Figure 13B:
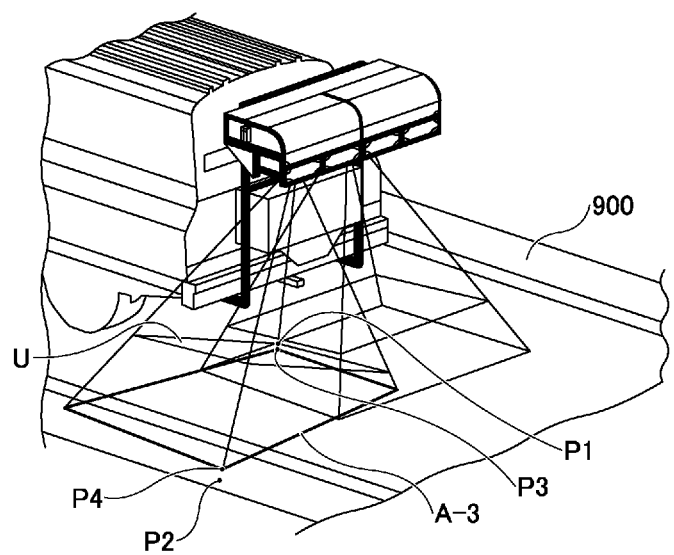

FIGS. 13A and 13B (FIG. 13) are schematic views of the effective working distance WD of the measurement apparatus 100 according to the first embodiment. FIG. 13A is a rear view of the measurement apparatus 100 viewed from the rear side. FIG. 13B is a perspective view of the measurement apparatus 100 viewed from the rear side. In FIG. 13, the trajectory of the optical path S-1 of the stereo camera 130-1 is omitted while the trajectory of the optical path S-2 of the stereo camera 130-2 and the trajectory of the optical path S-3 of the stereo camera 130-3 are illustrated. As to the measurement apparatus 100 according to the first embodiment, for example, a stereo camera having the effective working distance WD of 1000 mm to 2500 mm is employed as the stereo camera 130.

FIG. 13A illustrates one area (e.g., effective working distance WD-2) where defective images (e.g., image blurring) are less likely to occur in the trajectory of the optical path S-2 of the stereo camera 130-2. Similarly, FIG. 13A illustrates another area (e.g., effective working distance WD-3) where defective images (e.g., image blurring) are less likely to occur in the trajectory of the optical path S-3 of the stereo camera 130-3. As illustrated in FIG. 13A, each of the effective working distances WD-2 and WD-3 includes a region of truncated pyramid, which is a virtual region. The road surface 900, which is the measurement target, can be set within the effective working distance WD-2 forming one truncated pyramid and the effective working distance WD-3 forming another truncated pyramid. The road surface 900 can be similarly set within the effective working distance WD-1 forming still another truncated pyramid of the stereo camera 130-1 (see FIG. 11).

Further, as illustrated in FIGS. 13A and 13B, as to the effective working distance WD-3 of the stereo camera 130-3, a quadrangle or tetragon defined by the working distance closest to the stereo camera 130-3 in the truncated pyramid is defined as an upper face U, and a quadrangle or tetragon defined by the working distance farthest from the stereo camera 130-3 in the truncated pyramid is defined as a lower surface L. Since the stereo camera 130-3 is inclined toward the rear-left side, a front-right vertex P1 (first vertex P1) at the front right side is set at the lowest point among four vertices consisting the quadrangle or tetragon of the upper face U. Further, a rear-left vertex P2 (second vertex P2) at the rear-left side, diagonally opposite to the front-right vertex P1, is set as the highest point among four vertices consisting the quadrangle or tetragon of the lower face L.

Further, as illustrated in FIG. 13B, the image can be captured using an area A-3 including a vicinity point P3 set near the front-right vertex P1, set at the top of the truncated pyramid, and a vicinity point P4 set near the rear-left vertex P2, set at the bottom of the truncated pyramid, in which the vicinity point P3 and the vicinity point P4 are diagonally opposite with each other. With this configuration, the imaging range of the stereo camera 130-3 disposed at the outer side can be increased, with which the size of the imaging range A of the measurement apparatus 100 can be increased. Further, since the images can be captured within the effective working distance WD, defective images (e.g., image blurring) are less likely to occur in the acquired images.

The measurement apparatus 100 according to the first embodiment has been described using the stereo camera 130 used as the imaging device, but not limited thereto. Hereinafter, the measurement apparatuses according to other embodiments are described, in which the configuration and function described in the first embodiment can be similarly applied.

FIG. 14 is a cross-sectional view of a measurement apparatus 100A according to a second embodiment, which is viewed from the rear side. The measurement apparatus 100A includes, for example, a camera 130A having a monocular lens 131 as the imaging device.

The measurement apparatus 100 according to the first embodiment has been described as having the three stereo cameras 130 as the imaging devices, but not limited thereto. For example, the number of the imaging devices can be two, or four or more as indicated in other embodiments described in this specification.

Figure 15:
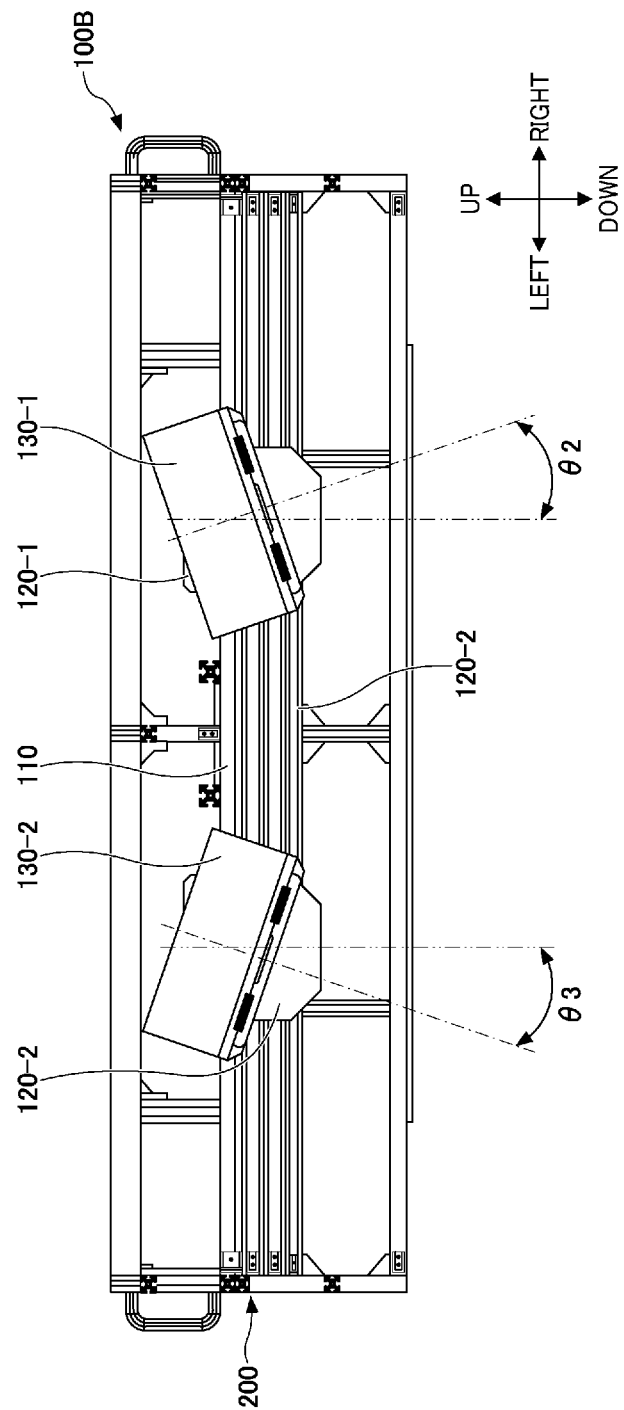
FIG. 15 is a cross-sectional view of a measurement apparatus according to a third embodiment, viewed from a rear side of the measurement apparatus.

FIG. 15 is a cross-sectional view of a measurement apparatus 100B according to a third embodiment, viewed from the rear side. The measurement apparatus 100B includes, for example, two stereo cameras 130 (130-1, 130-2). Each of the image capture directions of the stereo cameras 130-1 and 130-2 disposed at the outer sides in the width direction of the vehicle 700 is set with given angles "θ2" and "θ3," respectively, with respect to the width direction of the vehicle 700. The other configuration of the measurement apparatus 100B is the same as the configuration of the measurement apparatus 100 according to the first embodiment.

Figure 16:
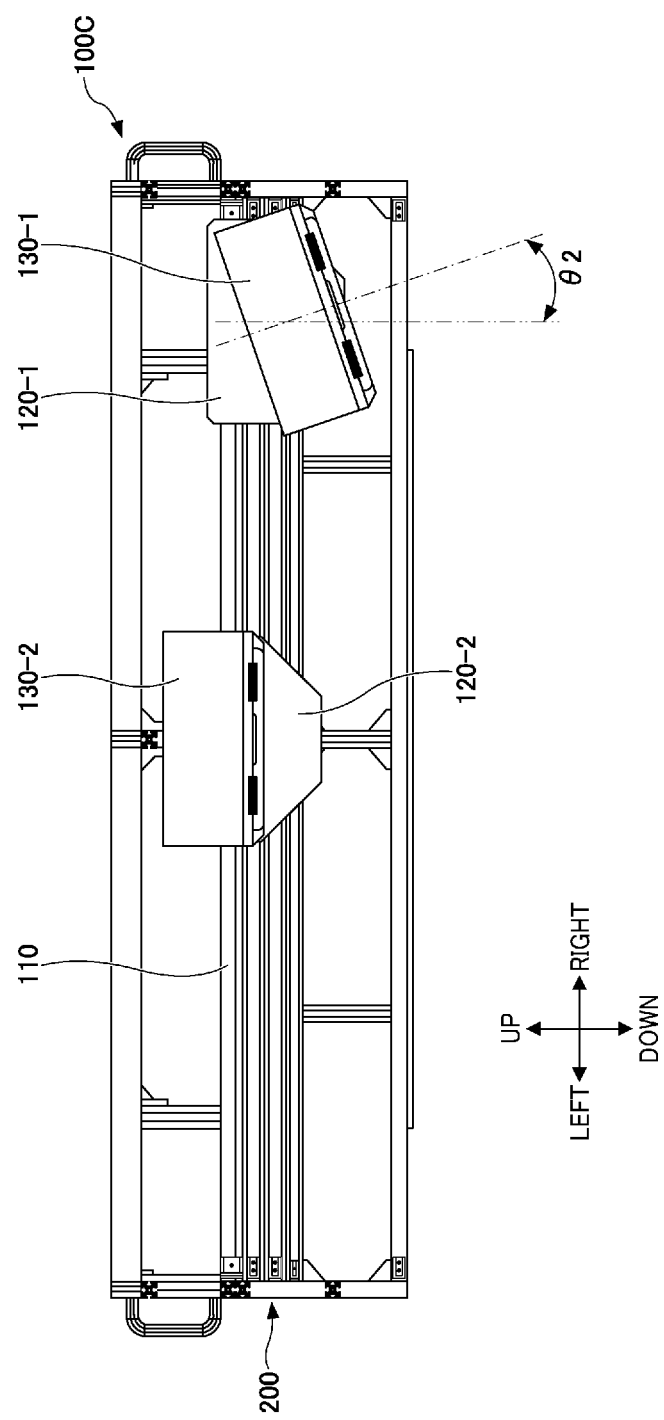
FIG. 16 is a cross-sectional view of a measurement apparatus according to a fourth embodiment, viewed from a rear side of the measurement apparatus.

FIG. 16 is a cross-sectional view of a measurement apparatus 100C according to a fourth embodiment, viewed from the rear side. The measurement apparatus 100C includes, for example, two stereo cameras 130 (130-1, 130-2). The image capture direction of the stereo camera 130-1 disposed at the outer side in the width direction of the vehicle 700 is set with a given angle "θ2" with respect to the width direction of the vehicle 700. On the other hand, the image capture direction of the stereo camera 130-2 is not set with a given angle with respect to the width direction of the vehicle 700. The other configuration of the measurement apparatus 100C is the same as the configuration of the measurement apparatus 100 according to the first embodiment. Although the stereo camera 130-1 at the right side set with the given angle "θ2" with respect to the width direction of the vehicle 700 while the stereo camera 130-2 at the left side is not set with the given angle with respect to the width direction of the vehicle 700, the configuration is not limited thereto. For example, the stereo camera 130-2 at the left side can be set with a given angle with respect to the width direction of the vehicle 700 while the stereo camera 130-1 at the right left is not set with a given angle with respect to the width direction of the vehicle 700.

Figure 17:
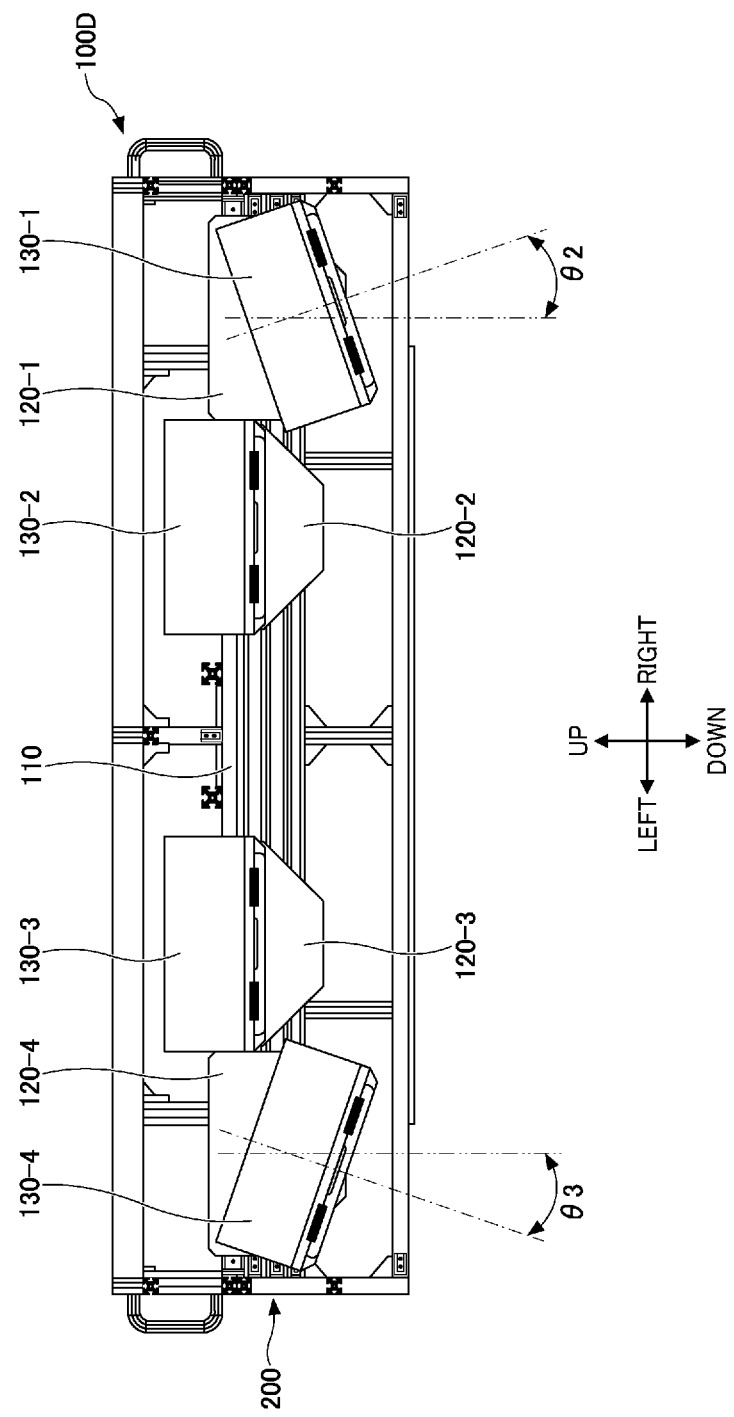
FIG. 17 is a cross-sectional view of a measurement apparatus according to a fifth embodiment, viewed from a rear side of the measurement apparatus.

FIG. 17 is a cross-sectional view of a measurement apparatus 100D according to a fifth embodiment, viewed from the rear side. The measurement apparatus 100D includes, for example, four stereo cameras 130 (130-1, 130-2, 130-3, 130-4). Each of the image capture directions of the stereo cameras 130-1 and 130-4 disposed at the outer sides in the width direction of the vehicle 700 set with given angles "θ2" and "θ3," respectively, with respect to the width direction of the vehicle 700. On the other hand, each of the image capture directions of the stereo cameras 130-2 and 130-3 is not set with a given angle with respect to the width direction of the vehicle 700. The other configuration of the measurement apparatus 100D is the same as the configuration of the measurement apparatus 100 according to the first embodiment.

Figure 18:
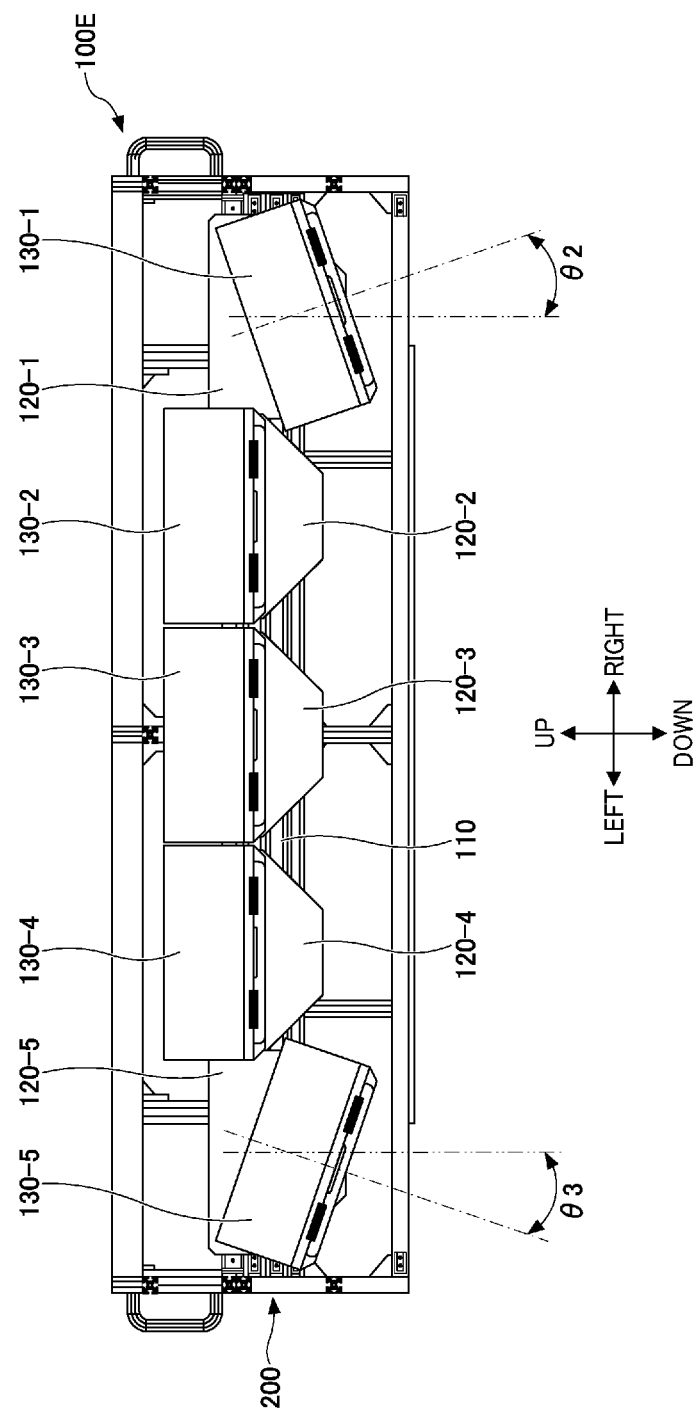
FIG. 18 is a cross-sectional view of a measurement apparatus according to a sixth embodiment, viewed from a rear side of the measurement apparatus.

FIG. 18 is a cross-sectional view of a measurement apparatus 100E according to a sixth embodiment, viewed from the rear side. The measurement apparatus 100E includes, for example, five stereo cameras 130 (130-1, 130-2, 130-3, 130-4, 130-5). Each of the image capture directions of the stereo cameras 130-1 and 130-5 disposed at the outer sides in the width direction of the vehicle 700 set with given angles "θ2" and "θ3," respectively, with respect to the width direction of the vehicle 700. On the other hand, each of the image capture directions of the stereo cameras 130-2, 130-3 and 130-4 is not set with a given angle with respect to the width direction of the vehicle 700. The other configuration of the measurement apparatus 100E is the same as the configuration of the measurement apparatus 100 according to the first embodiment. In any one of the above-described embodiments, the measurement apparatus is used while it is mounted on a vehicle such as a car, truck, etc. The measurement apparatus may be mounted on any movable apparatus capable of moving.

REFERENCE SIGNS LIST 100, 100A-100E Measurement apparatus
110 Base frame
120 Camera mount
130 Stereo camera (imaging device)
130A Monocular camera (imaging device)
131 Lens
200 Protection cover unit
211, 211a, 211b, 211c, 212a, 212b Opening
216a, 216b Frame
700 Vehicle (movable apparatus)
750 Mount
800 Movable measurement apparatus
900 road surface (imaging target)
S Trajectory of optical path
A Imaging range
D Overlapping region
WD Effective working distance
N Interference area
F Forward direction
P1 Vertex (first vertex)
P2 Vertex (second vertex)
P3, P4 Vicinity point

The invention claimed is:

1. A measurement apparatus mountable on a movable apparatus, the measurement apparatus comprising:
a plurality of imaging devices including at least a first imager and a second imager,
wherein the first imager is disposed closer to an imaging target than the second imager,
wherein a first image capture range of the first imager and a second image capture range of the second imager at least partially overlap at the imaging target,
wherein when a first inclination angle "θ2A" of the first imager with respect to a width dimension of the movable apparatus is defined by a first image capture direction of the first imager and a perpendicular line extended perpendicularly from the imaging target, and a second inclination angle "θB" of the second imager with respect to the width dimension of the movable apparatus is defined by a second image capture direction of the second imager and the perpendicular line extended perpendicularly from the imaging target, the first inclination angle "θ2A" and the second inclination angle "θB" satisfy a condition of "θ2A>θB."

2. The measurement apparatus according to claim 1,
wherein a given effective working distance of the first imager forms a truncated pyramid having an upper face formed by a working distance closest to the first imager and a lower face formed by a working distance farthest from the first imager, and
wherein an image captured by the first imager is formed by using a point set near a first vertex, one of vertices consisting of the upper face, and a point set near a second vertex, one of vertices consisting of the lower face, the first vertex and the second vertex being diagonally opposite each other.

3. The measurement apparatus according to claim 1, wherein the first imager is disposed outside the second imaging range of the second imager.

4. The measurement apparatus according to claim 1, wherein the first imager and the second imager are disposed to satisfy a condition of |θ2A−θB|≤30°.

5. The measurement apparatus according to claim 1, wherein the second imaging apparatus is disposed to satisfy a condition of θB=0°.

6. The measurement apparatus according to claim 1,
wherein the first imager has an angle defined by the first image capture direction of the first imager and a vertical direction of the movable apparatus in a direction of travel of the movable apparatus, and
wherein the second imager has an angle defined by the second image capture direction of the second imager and the vertical direction of the movable apparatus in the direction of travel of the movable apparatus.

7. The measurement apparatus according to claim 1, wherein each of the first imager and the second imager is a stereo camera including at least two lenses.

8. The measurement apparatus according to claim 7, wherein the lenses included in the stereo camera are wide-angle lenses.

9. A movable apparatus, comprising the measurement apparatus according to claim 1.

10. A vehicle, comprising the measurement apparatus according to claim 1.

11. The measurement apparatus according to claim 1, wherein each of the first imager and the second imager is a stereo camera including at least two lenses.

12. The measurement apparatus according to claim 11, wherein the lenses included in the stereo camera are wide-angle lenses.

* * * * *